United States Patent [19]
Kellogg et al.

[11] Patent Number: 5,833,381
[45] Date of Patent: Nov. 10, 1998

[54] REMOVABLE DOCUMENT FEEDER CARTRIDGE FOR COMBINATION PRINTER AND SCANNER

[75] Inventors: William H. Kellogg; Samuel A. Stoddar, both of Encinitas; Darren W. Wilcox, San Diego, all of Calif.

[73] Assignee: Hewlett-Packard Company, Palo Alto, Calif.

[21] Appl. No.: 782,438

[22] Filed: Jan. 15, 1997

[51] Int. Cl.[6] .................................................. B41J 13/10
[52] U.S. Cl. ...................... 400/624; 400/629; 400/642; 400/625; 358/498; 271/274
[58] Field of Search .................................. 400/624, 625, 400/629, 605, 610, 610.1, 363, 637.3, 642; 271/273, 274; 358/498

[56] References Cited

U.S. PATENT DOCUMENTS

| | | | |
|---|---|---|---|
| 3,964,738 | 6/1976 | Garcia | 271/274 |
| 4,583,726 | 4/1986 | Nogi et al. | 271/274 |
| 5,098,210 | 3/1992 | Fujisawa et al. | 400/624 |
| 5,173,596 | 12/1992 | Kapinos et al. | 271/274 |
| 5,203,217 | 4/1993 | Buckley | 271/273 |
| 5,391,009 | 2/1995 | Stodder | 400/605 |
| 5,540,427 | 7/1996 | Nitta et al. | 271/274 |
| 5,559,609 | 9/1996 | Yamada et al. | 358/498 |

FOREIGN PATENT DOCUMENTS

| | | | |
|---|---|---|---|
| 6-155836 | 6/1994 | Japan | 400/642 |

*Primary Examiner*—Christopher A. Bennett

[57] ABSTRACT

A combination printer and scanner comprises a frame, rollers mounted in the frame for defining a single paper path therethrough, an automatic sheet feeder mounted to the frame for selectively providing to the single paper path clean paper print sheets, and an automatic document feeder mounted to the frame for selectively providing to the single paper path documents having text and/or graphics printed thereon to be scanned. The combination printer and scanner further comprises a scanner station mounted in the frame for scanning documents conveyed through the single paper path and a printer station mounted in the frame for printing text and/or graphics on print sheets conveyed through the single paper path. A document feeder cartridge is normally positioned adjacent a scanner window of the scanner station to partially define a segment of the single paper path adjacent the scanner station. The document feeder cartridge may be manually removed to permit the clearing of paper jams, the cleaning of the scanner window and the removal of debris.

25 Claims, 8 Drawing Sheets

REMOVABLE DOCUMENT FEEDER CARTRIDGE FOR COMBINATION PRINTER AND SCANNER

CROSS-REFERENCE TO RELATED APPLICATION

This application is related to U.S. patent application Ser. No. 08/712,109, filed Sep. 13, 1996 and entitled COMBINATION PRINTER AND SCANNER HAVING SINGLE PAPER PATH WITH PINCH ROLLERS ACTUATED BY PEN DOOR. Said application names William H. Kellogg as the sole inventor and is assigned to Hewlett-Packard Company, the assignee of the subject application. The entire disclosure of said prior application is hereby incorporated by reference.

BACKGROUND OF THE INVENTION

The present invention relates to computer printers and facsimile machines, and more particularly, to mechanisms for enabling a user to clear a paper jam, clean a scanner window or remove debris in such devices.

In computer printers and facsimile machines, it is very important to be able to remove a sheet of paper jammed somewhere in the paper path. In facsimile machines, it is also important to be able to clean the scanner window in order to insure that a high quality image of the document being scanned can be reproduced at the receiving facsimile machine. In both printers and facsimile machines it is periodically necessary to remove dust and other debris.

Over the past several years, combination printer and scanner devices have become popular. These devices may be connected to a conventional personal computer for printing high quality text and graphics on plain paper utilizing an ink jet printer cartridge. They also incorporate optical scanning elements and a modem for permitting documents having text and/or graphics printed thereon to be sent to remote location via facsimile over standard telephone lines. In some instances, a combined printer and scanner can actually scan a document, and then print an image thereof on a sheet of paper, thereby operating as an inexpensive copier. An example of a combination printer and scanner having the foregoing capabilities is the OfficeJet (trademark) desktop unit manufactured by Hewlett-Packard Company, the assignee of the present application.

Combination printer and scanner devices have typically incorporated two separate paper paths. One of these paths is utilized for feeding clean paper print sheets to a printer station. The other paper path is utilized to feed documents to be scanned to a scanner station. Access to the print sheet path is independent of access to the document scanning path. The clearing of paper jams, the cleaning of the scanner window and the removal of debris in such prior art devices is cumbersome and complex. The user must know how to access each of the separate paths and how to release the pinch rollers therein. In U.S. Pat. No. 5,391,009 of Stodder, assigned to Hewlett-Packard Company, there is disclosed an improved combination printer and scanner having a single common paper path. However, the construction of this device does not allow for simple and rapid clearing of paper jams, cleaning of the scanner window and removal of debris.

SUMMARY OF THE INVENTION

It is therefore the primary object of the present invention to provide a removable document feeder cartridge for a printer.

It is a further object of the present invention to provide an improved printer and scanner having a removable document feeder cartridge for facilitating the clearing of paper jams, the cleaning of its scanner window and the removal of debris.

According to the present invention a manually removable document feeder cartridge for a printer is provided. The document feeder cartridge comprises a main body having an underside configured to partially define a segment of a paper path through the printer. A plurality of pinch rollers are mounted in the body so that they protrude through a plurality of corresponding apertures in the underside of the main body so that they engage and roll against a print sheet conveyed along the paper path past the underside of the main body.

According to another aspect of the present invention a combination printer and scanner comprises a frame, a plurality of rollers mounted in the frame for defining a single paper path therethrough, an automatic sheet feeder mounted to the frame for selectively providing clean paper print sheets to the single paper path, and an automatic document feeder mounted to the frame for selectively providing to the single paper path documents having text and/or graphics printed thereon to be scanned. The combination printer and scanner further comprises a scanner station mounted in the frame for scanning documents conveyed through the single paper path and a printer station mounted in the frame for printing text and/or graphics on print sheets conveyed through the single paper path. A document feeder cartridge is normally positioned adjacent a scanner window of the scanner station to partially define a segment of the single paper path adjacent the scanner station. The document feeder cartridge may be manually removed to permit the clearing of paper jams, the cleaning of the scanner window and the removal of debris.

DETAILED DESCRIPTION OF THE PREFERRED EMBODIMENT

Figure 1:
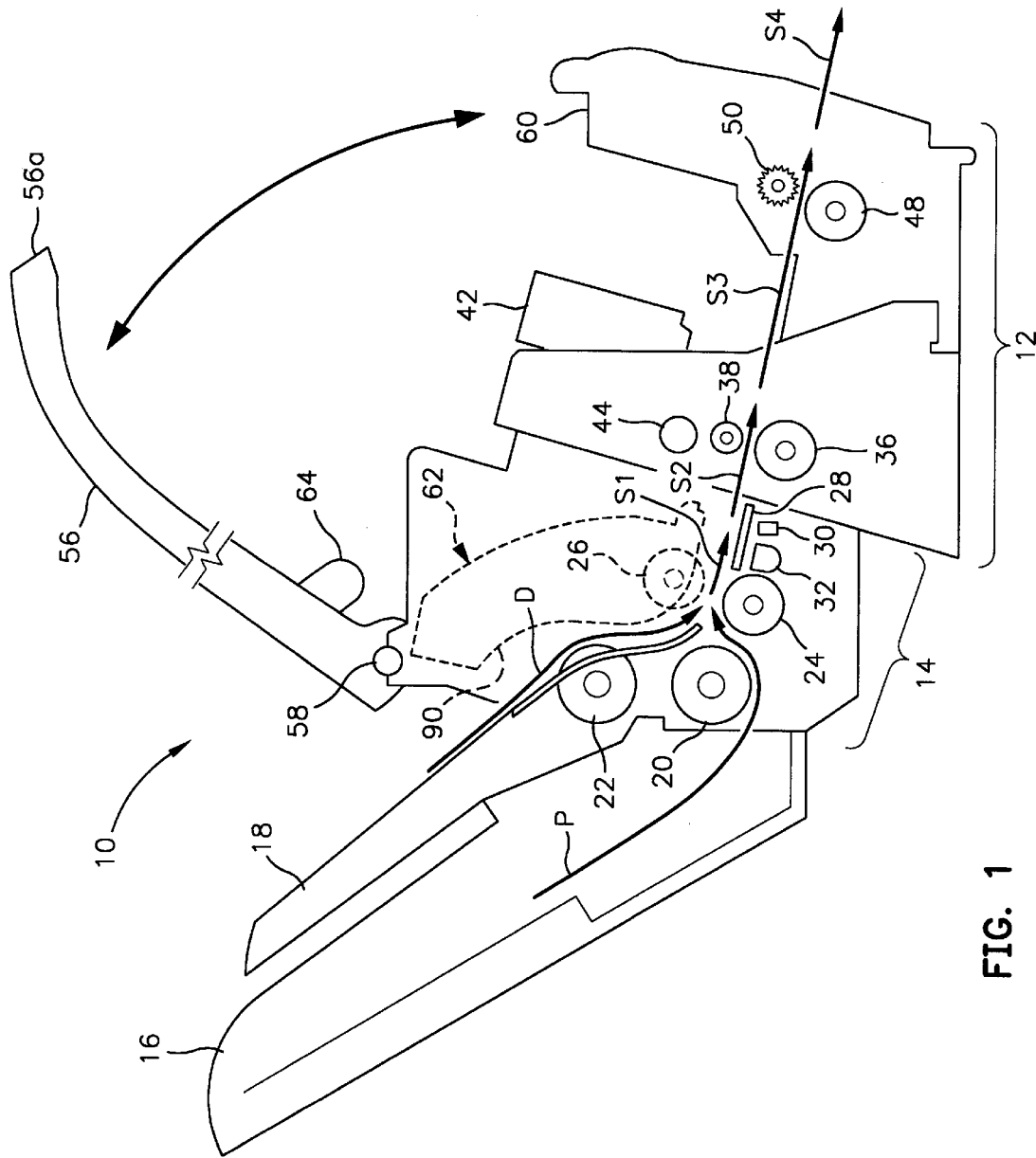
FIG. 1 is a diagrammatic side view of a combination printer and scanner embodying a preferred embodiment of the present invention.
Figure 2A:
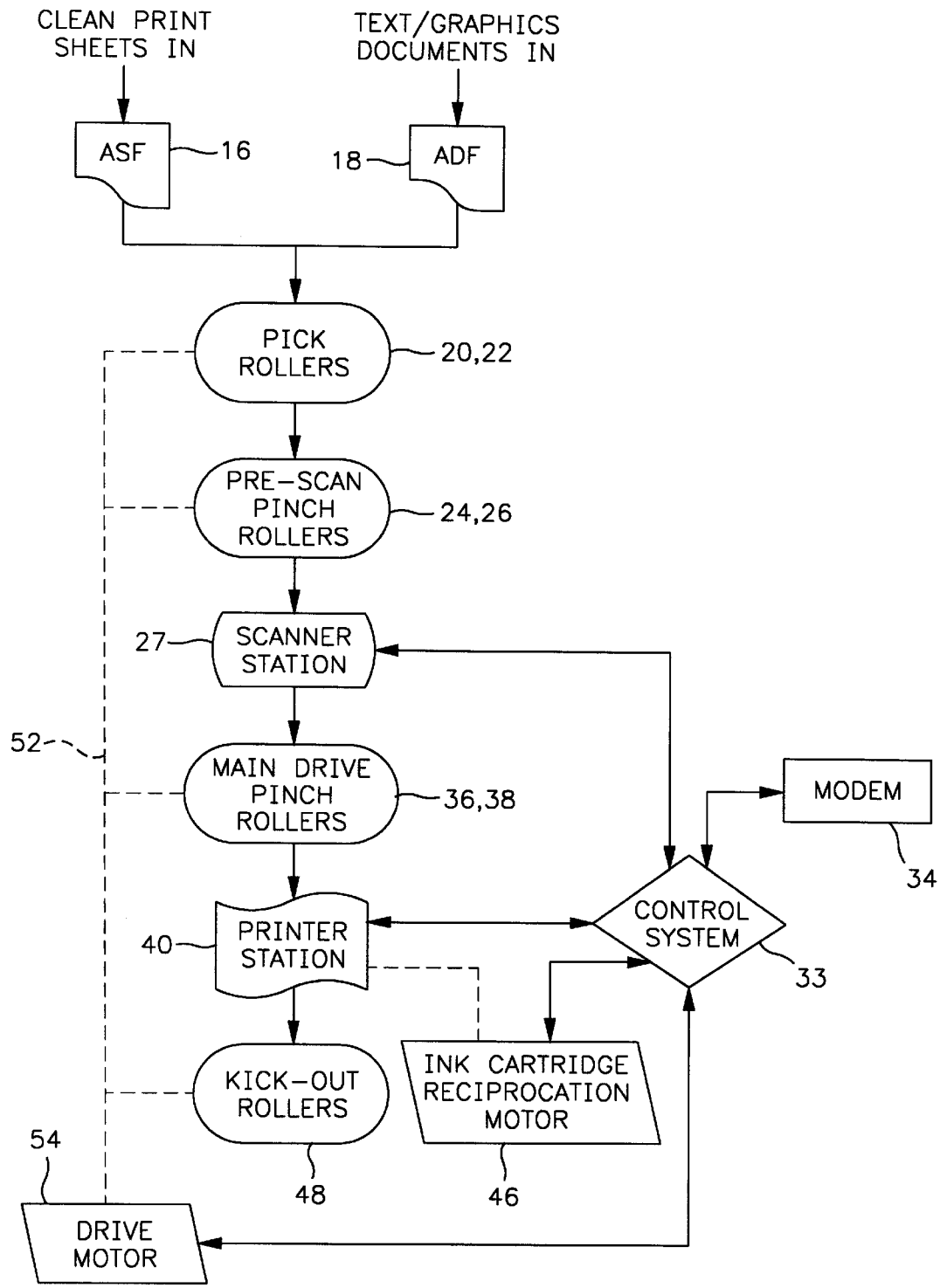
FIG. 2A is a functional block diagram of the preferred embodiment of FIG. 1.
Figure 2B:
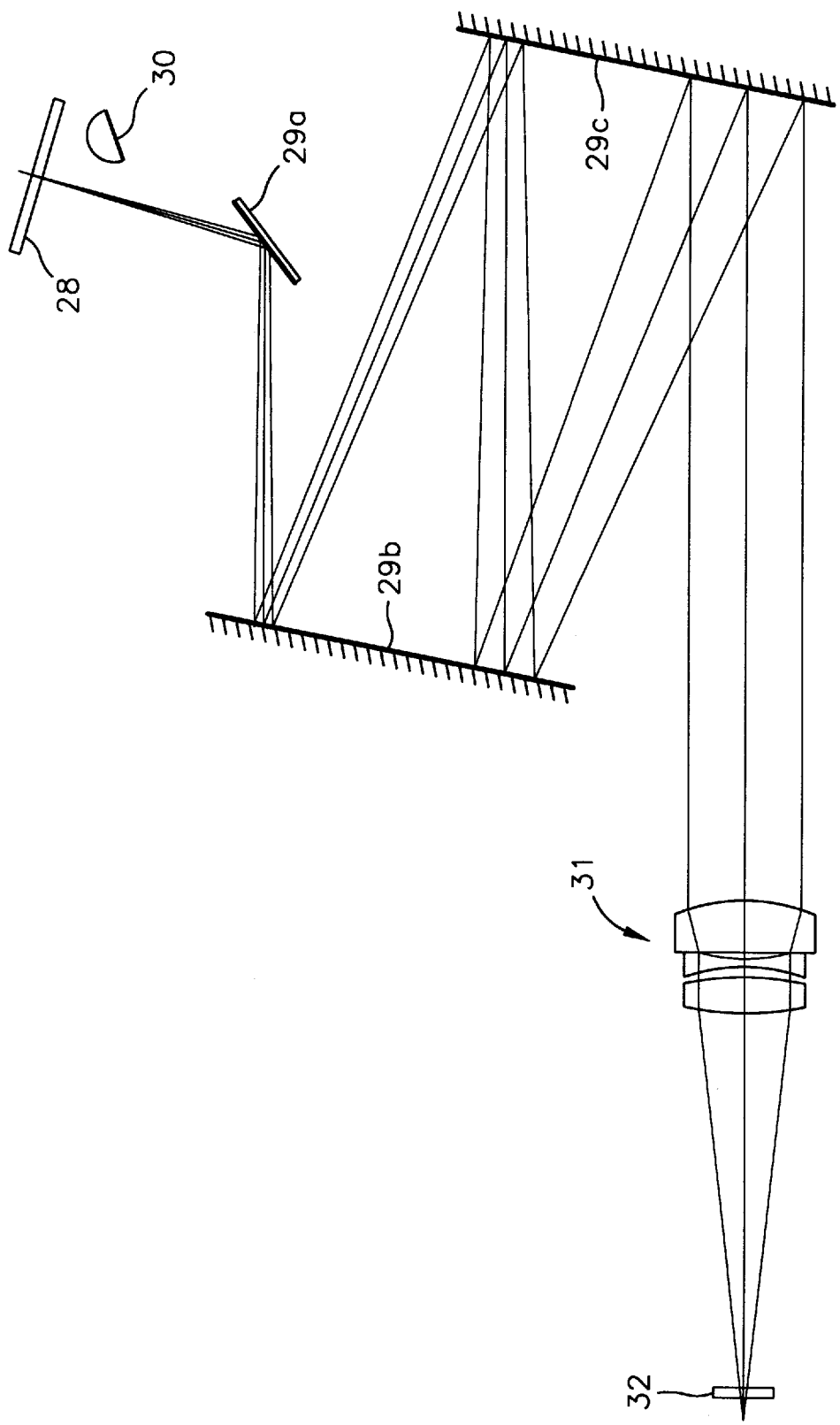
FIG. 2B is a schematic illustration of the optics in the scanner station of the preferred embodiment of FIG. 1.
Figure 3:
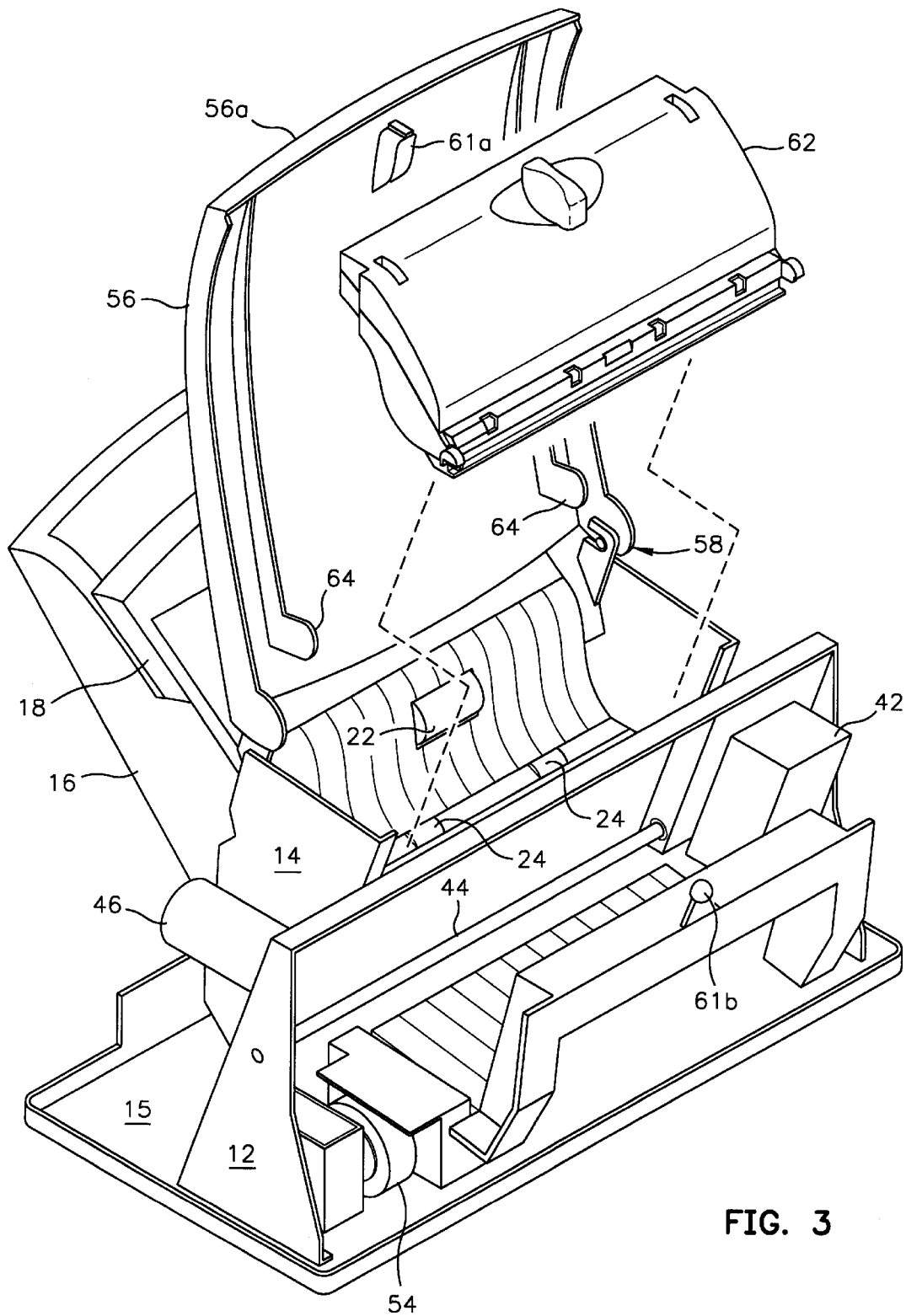
FIG. 3 is a simplified isometric view of the preferred embodiment showing its pen door open and its document feeder cartridge removed.

Referring to FIGS. 1, 2A, 2B and 3, the illustrated embodiment 10 of the combination printer and scanner of the present invention includes a forward printer chassis 12 and a rearward media chassis 14. The rearward media chassis 14 is connected to, and supported by, the printer chassis 12. The printer chassis 12 and media chassis 14 sit on a horizontal base 15 (FIG. 3) and together these parts provide a frame for mounting and supporting the components hereinafter described on a desktop. A stack of clean paper print sheets is loadable into an automatic sheet feeder (ASF) 16 (FIGS. 1, 2A and 3) connected to the media chassis 14. A stack of documents having text and/or graphics to be scanned is loadable into an automatic document feeder (ADF) 18 (FIGS. 1, 2A and 3) also connected to the media chassis 14. Individual clean paper print sheets can be picked off from the stack in the ASF 16 and drawn into a common paper path by an ASF pick roller 20 (FIGS. 1 and 2A). Alternatively, individual documents having text and/or graphics to be scanned can be picked off the stack in the ADF 18 and drawn into the same common paper path by an ADF pick roller 22 as best seen in FIG. 3. The print sheets travel from the ASF 16 along the path labeled P in FIG. 1. The documents to be scanned travel from the ADF 18 along the path labeled D in FIG. 1. The paths P and D merge into a common single paper path, the first segment of which is labeled S1 in FIG. 1. The print sheets or documents are grabbed between a plurality of pre-scan pinch rollers 24 and 26 (FIGS. 1, 2A and 3) which draw these pages through a scanner station 27 (FIG. 2A) along the segment of the paper path labeled S1 in FIG. 1.

The principal optical components of the scanner station 27 are illustrated schematically in FIG. 2B. The scanner station 27 includes a transversely extending transparent scanner window 28, mirrors 29a, 29b and 29c, an illumination source 30, a lens assembly 31 and a photodetector 32. When the combination printer and scanner 10 operates in its scan mode, a document having text and/or graphics printed on the underside thereof will have this information illuminated through the scanner window 28 by the source 30. An image of the text and/or graphics is reflected by the mirrors 29a, 29b and 29c and is focused by the lens assembly 31 onto the photodetector 32. The photodetector 32 may comprise a plurality of charge coupled devices (CCDs). Signals from the photodetector 32 are amplified, digitized, and then conveyed through a control system 33 (FIG. 2A) to a conventional digital modem 34 for transmission over standard telephone lines.

Print sheets or documents which pass over the scanner window 28 are pulled along the segment of the paper path labeled S2 in FIG. 1 by a pair of main drive pinch rollers 36 and 38 (FIGS. 1 and 2A) through a printer station 40 (FIG. 2A). The printer station 40 includes an ink jet print cartridge 42 (FIGS. 1 and 3) mounted for reciprocal motion on a transverse rod 44. When the combination printer and scanner 10 operates in its print mode, text and/or graphics are printed by the ink jet print cartridge 42 on the upper side of a clean print sheet pulled from the ASF 16 as the print sheet passes along the segment of the paper path labeled S3 in FIG. 1. The print cartridge 42 has an active lower face through which tiny droplets of ink are expelled in conventional fashion when the cartridge is driven by the appropriate signals from a print drive circuit in the control system 33 (FIG. 2A). The height of the print cartridge 42 above the paper path S3 is exaggerated in FIG. 1. The print cartridge 42 is reciprocated back and forth along the rod 44 by an ink cartridge reciprocation motor 46 (FIGS. 2A and 3). The motor 46 is driven by a motor drive circuit in the control system 33 (FIG. 2A).

The print sheets or documents are next pulled through the printer chassis 12 by kick-out rollers 48 (FIGS. 1 and 2A) which cooperate with an adjacent plurality of toothed star rollers 50. The printed sheets or scanned documents exit the printer chassis 12 along the segment of the paper path labeled S4 in FIG. 1. The pick, pinch, drive and kick-out rollers are connected through a gear drive train 52 (FIG. 2A) to a single drive motor 54 (FIGS. 2A and 3). The drive motor 54 is preferably a stepper motor. It is driven by a stepper motor drive circuit in the control system 33 (FIG. 2A). The stepper motor drive circuit facilitates precision coordinated driving of clean print sheets or documents to be scanned from the ASF 16 and the ADF 18, respectively, through the media chassis 14 and through the printer chassis 12.

A pen door 56 (FIGS. 1 and 3) is hingedly connected to the upper part of the media chassis 14 by a hinge assembly 58. This permits the pen door 56 to rotate between its open position illustrated in phantom lines in FIG. 7 to its closed position illustrated in solid lines in FIG. 7. In its closed position the remote outer end 56a of the pen door 56 seats in a receptacle 60 (FIG. 1) formed in an upper forward part of the printer chassis 12. A latch assembly including a latch member 61a (FIG. 3) on the underside of the pen door 56 holds the pen door 56 in its closed position. The latch member 61a snaps over a latch element 61b connected to the printer chassis 12. The pivoting motion of the pen door 56 is shown by the double ended arrow in FIG. 1. When in its closed position, the pen door 56 conceals the rollers, drive train, motors, print cartridge and so forth located inside the media chassis 14 and the printer chassis 12.

A manually removable document feeder cartridge 62 is illustrated in phantom lines in FIG. 1 and solid lines in FIG. 3. The document feeder cartridge 62 is normally seated within the upper part of the media chassis 14. The document feeder cartridge 62 incorporates the pinch rollers 26. An operator may lift the pen door 56 to its open position illustrated in FIG. 1, remove the document feeder cartridge 62 and fix a paper jam, clean the scanner window 28 or remove any debris, such as dust, white-out residue, or a staple It is important to be able to clean the scanner window 28, since debris thereon may cause vertical streaks to appear in the facsimile reproduction of the document sent by the modem 34 when printed at the remote receiving station. As will be explained in greater detail hereafter, the inner end of the pen door 56 has a pair of actuators 64 (FIGS. 1 and 3) projecting downwardly from the underside thereof which engage the document feeder cartridge 62 when the pen door is closed. Through this process, the document feeder cartridge 62 is clamped in its appropriate location against datum surfaces hereafter described. This ensures that the correct paper path is formed between the pick roller 22 and the underside of the document feeder cartridge 62. In addition, the engagement between the actuators 64 of the pen door 56 and the document feeder cartridge 62 also causes the proper tension or load to be placed on the pinch rollers 26. Proper tension on the pinch rollers 26 ensures that the pages will travel smoothly along the paper path.

Figure 4:
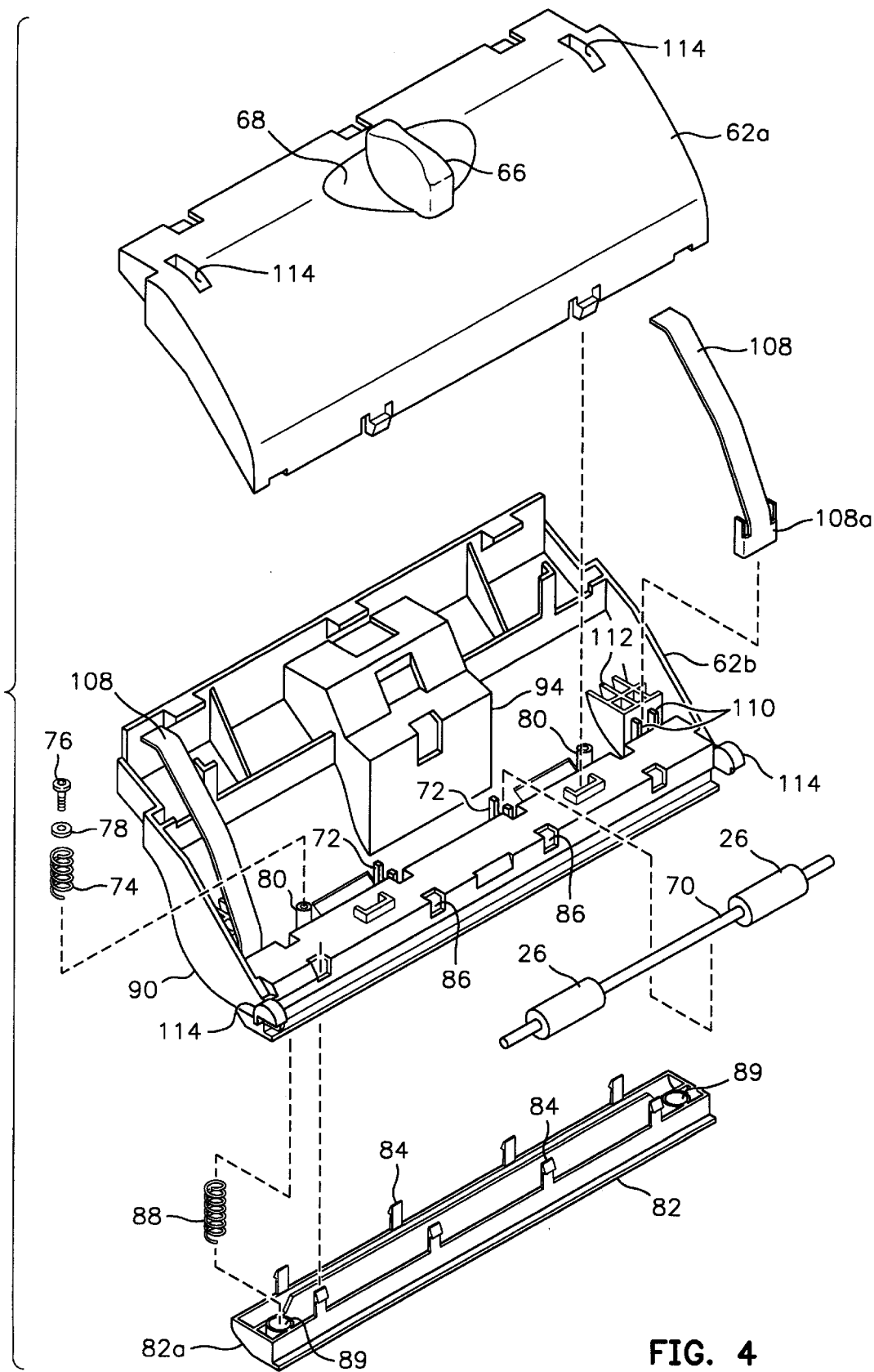
FIG. 4 is an enlarged, exploded, isometric view of the document feeder cartridge.
Figure 5:
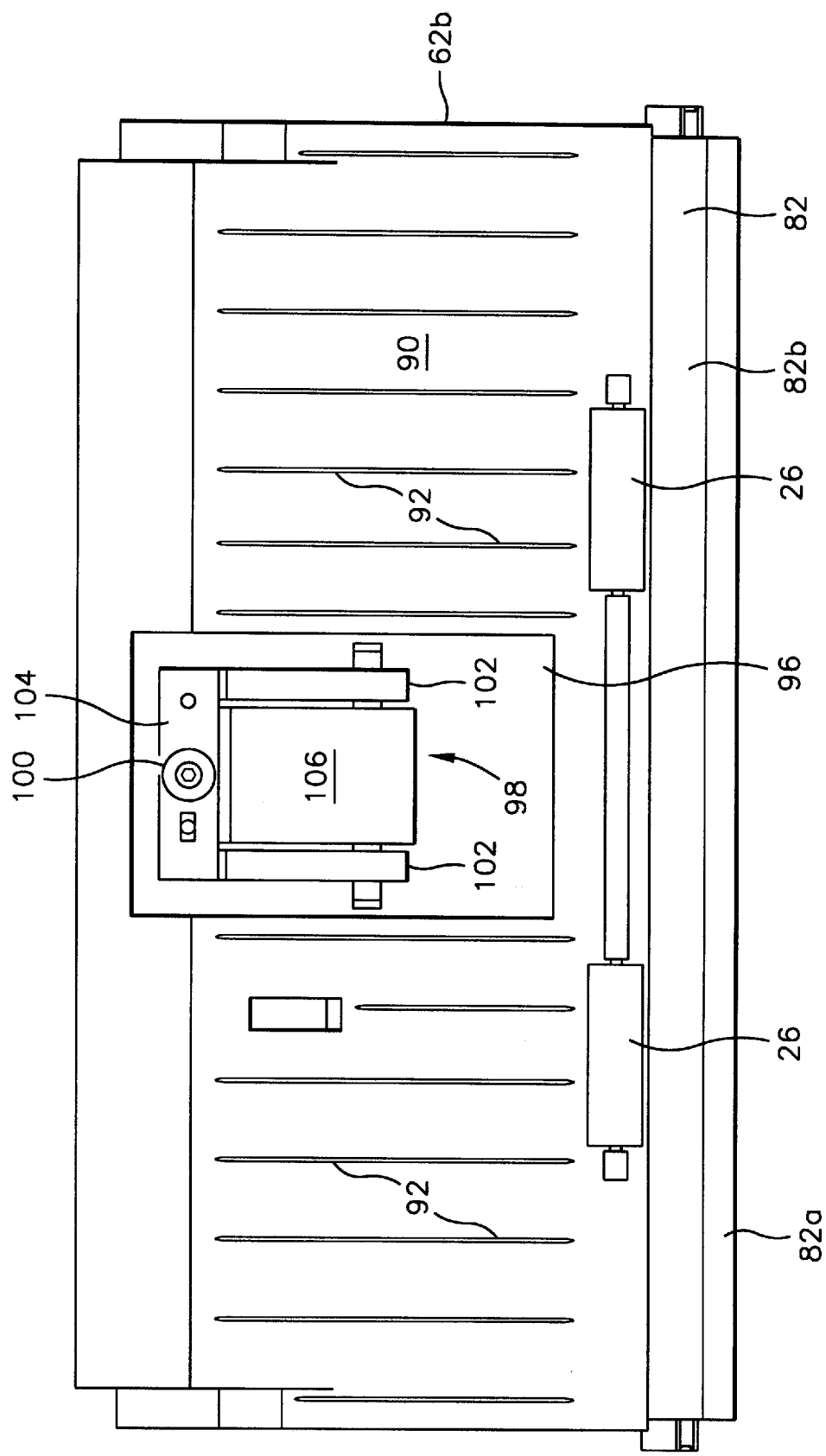
FIG. 5 is an enlarged bottom view of the document feeder cartridge.

Details of the construction of document feeder cartridge 62 are illustrated in FIGS. 4 and 5. As seen therein, the document feeder cartridge 62 includes a main hollow body formed of upper and lower sections 62a and 62b preferably made of injection molded plastic. A manually gripable projection in the form of knob or handle 66 extends from a recess 68 on the upper section 62a of the document feeder cartridge 62. A user may grasp the handle 66 between the thumb and index finger to lift the document feeder cartridge 62 out of the media chassis 14. Finger slots or recesses could be used alone, without any knob or handle.

Figure 6:
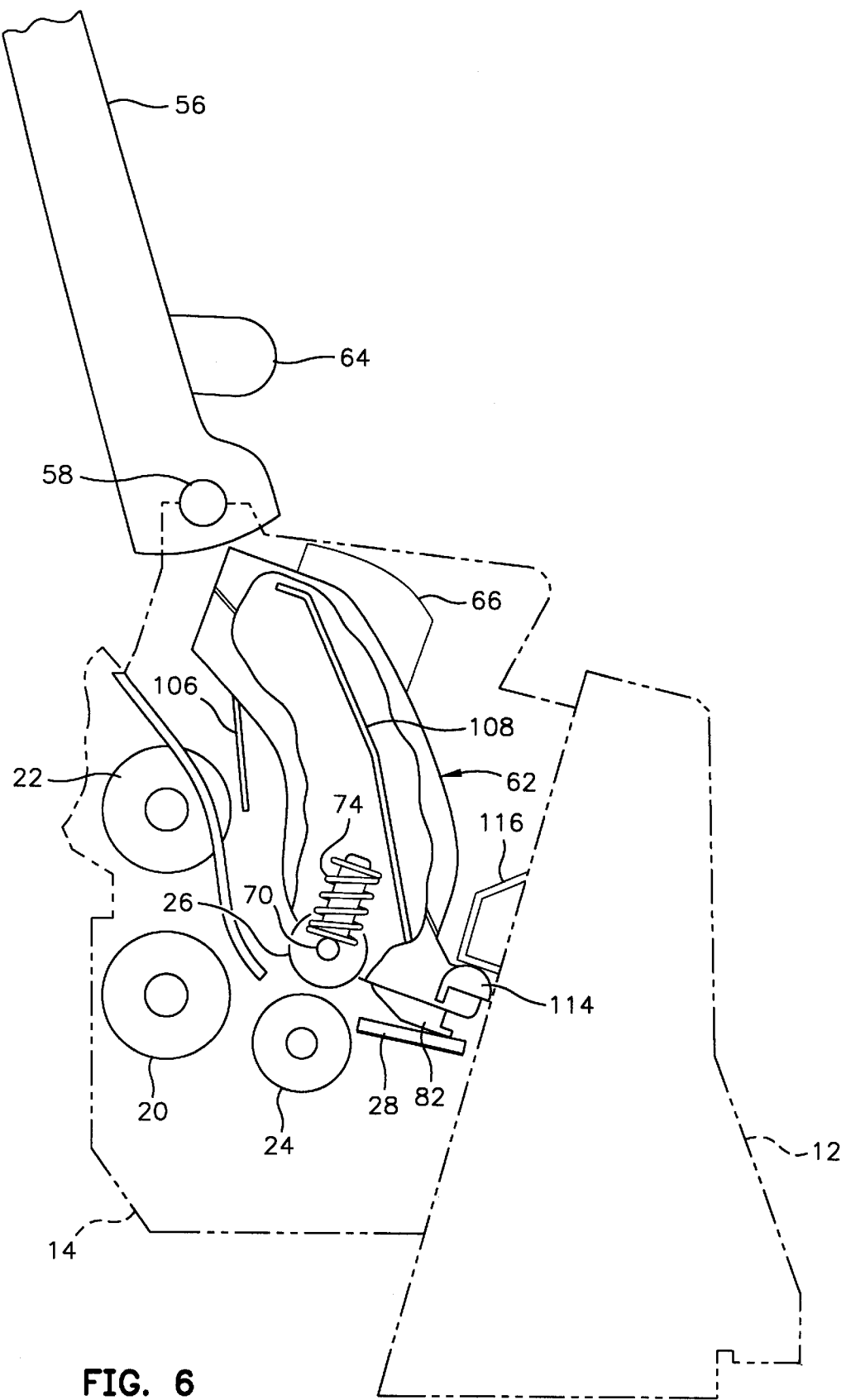
FIG. 6 is an enlarged, simplified side elevation view of the preferred embodiment of the combination printer and scanner illustrating the position of the document feeder cartridge before it is clamped in position by closure of the pen door.
Figure 7:
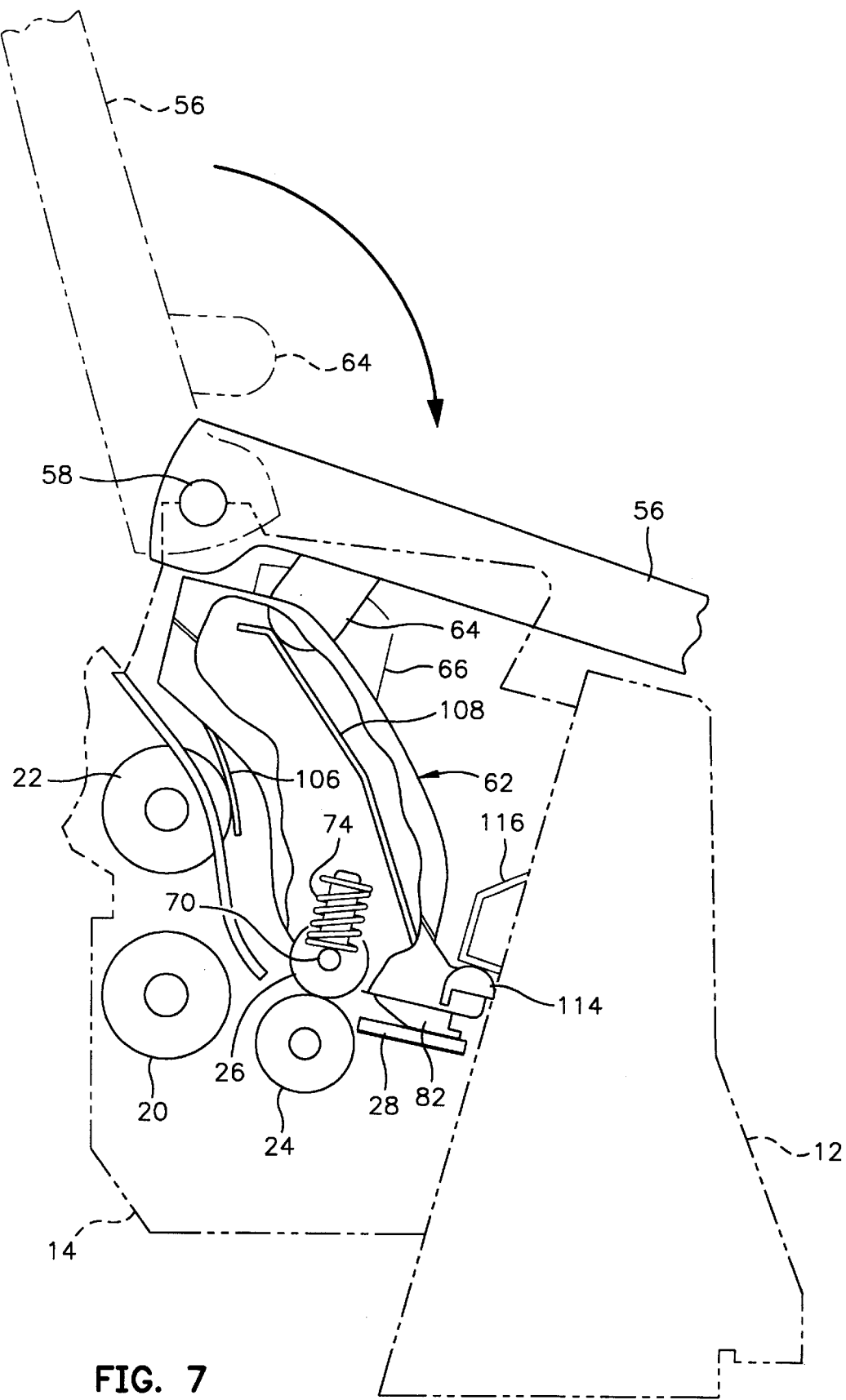
FIG. 7 is a view similar to FIG. 6 showing the document feeder cartridge fully clamped in position by closure of the pen door.

The pinch rollers 26 (FIG. 4) are journaled on a shaft 70. The shaft 70 is supported in clevises 72 extending upwardly from the lower section 62b of the document feeder cartridge 62. As shown in FIGS. 6 and 7, the opposite ends of the shaft 70 are located under the lower ends of coil springs 74 which are held in position by screws and washers 76 and 78 (FIG. 4). The screws 76 thread into vertical cylindrical sleeves 80 extending upwardly within the interior of the lower document feeder cartridge section 62b. In this manner the pinch rollers 26 are biased toward the single paper path when the document feeder cartridge 62 is normally positioned inside the media chassis 14.

A white plastic background element 82 (FIGS. 4 and 5) snaps into an underside of the lower document feeder cartridge section 62b. The white background element 82 aligns with, and substantially covers, the scanner window 28 (FIG. 1) when the cartridge is normally positioned within the media chassis 14. The white background element 82 provides a suitable diffusely reflecting background for a document being conveyed over the scanner window 28 to optimize the illumination of the text and/or graphics thereon by the source 30 (FIG. 1) through the scanner window 28. As seen in FIGS. 4 and 5, the white background element 82 has an underside which is tapered along its leading edge at 82a to receive and direct the pages being conveyed along the single paper path segments S1 and S2.

The white background element 82 (FIG. 4) is mounted to reciprocate upwardly and downwardly relative to the lower document feeder cartridge section 62b. A plurality of vertical legs 84 (FIG. 4) having hooks at their upper ends extend upwardly through corresponding aligned apertures 86 in the lower document feeder cartridge section 62b. The hook portions of the legs 84 prevent the white background element 82 from falling out of the document feeder cartridge 62 when the same is manually removed by a user. The white background element 82 is resiliently mounted to the lower document feeder cartridge section 62b utilizing a pair of coil springs 88. The lower ends of the springs 88 seat within cylindrical receptacles 89 formed in the upper side of the white background element 82. The upper ends of the coil springs 88 seat in similar downwardly facing cylindrical receptacles (not visible) projecting from the underside of the lower document feeder cartridge section 62b.

The underside 90 (FIG. 5) of the lower document feeder cartridge section 62b has a convoluted or reversely curved wave shape best seen in FIG. 4. This generally S-shaped underside 90 defines the portions of the single common paper path adjacent the arrows D and S1 in FIG. 1. A plurality of longitudinally extending parallel ribs 92 (FIG. 5) project from the underside 90 of the lower document feeder cartridge section 62b. The ribs 92 lessen the friction between the document feeder cartridge 62 and a page being fed through the single common paper path.

A housing 94 (FIG. 4) formed in the lower document feeder cartridge section 62b forms a downwardly opening receptacle 96 (FIG. 5). A document stripper assembly 98 is mounted in the receptacle 96 via bolt and washer assembly 100. The document stripper assembly 98 includes a pair of resilient leaf springs 102 whose inner ends are connected to a plate 104 secured by the bolt and washer assembly 100. The opposite ends of the leaf springs 102 are free to bend inwardly into the receptacle 96. The document stripper assembly 98 further includes a friction pad 106. The inner end of the friction pad 106 is rigidly secured to the plate 104 while the outer end of the friction pad 106 is free to depress inwardly into the receptacle 96. The document stripper assembly 98 cooperates with the ADF pick roller 22 (FIG. 1) to draw a single document to be scanned from the ADF 18. The document picker assembly 98 is not illustrated in FIG. 1 for the sake of clarity. The friction pad 106 of the document stripper assembly 98 is visible in FIGS. 6 and 7.

The document feeder cartridge 62 is clamped in position in the media chassis 14 by closing the pen door 56 from its open position illustrated in FIG. 6 to its closed position illustrated in solid lines in FIG. 7. A pair of leaf springs 108 (FIGS. 4, 6 and 7) are mounted inside the hollow document feeder cartridge 62 at opposite ends thereof. The lower ends of the leaf springs 108 are formed with mounting frames 108a (FIG. 4) which slip over parallel upstanding ribs 110 that project from mounting blocks 112 extending upwardly within the lower document feeder cartridge section 62b. When the upper document feeder cartridge section 62a is secured to the lower document feeder cartridge section 62b the mounting frames 108a are locked into position because of the configuration of the inside surface of the upper document feeder cartridge section 62a. The upper ends of the progressively bent leaf springs 108 are free to flex upwardly and downwardly. The upper document feeder cartridge section 62a is formed with apertures or slots 114 at opposite ends thereof through which the actuators 64 can penetrate as shown in FIG. 7 in order to contact and engage the upper ends of the leaf springs 108.

When the document feeder cartridge 62 is manually loaded inside of the media chassis 14, the document feeder cartridge 62 is mated with a plurality of datum surfaces on the media chassis 14. As best seen in FIG. 4, the lower document feeder cartridge section 62b is formed at its opposite lower ends with a pair of hemispherical registration projections 114. When the document feeder cartridge 62 is manually inserted into the media chassis 14, these registration projections 114 are slipped under corresponding shoulder projections 116 (FIG. 6) that extend rearwardly from the media chassis 14. The flat undersides of these projections 116 form the datum surfaces. When the document feeder cartridge 62 is inserted into its initial load position illustrated in FIG. 6, the underside of the white background element 82 is aligned with, and overlies, the scanner window 28. Because the white background element 82 is resiliently mounted, it can deflect upwardly to allow a piece of paper to be propelled between the element 82 and the scanner window 28. Once the pen door 56 is swung to its fully closed position illustrated in FIG. 7, the actuators 64 penetrate the apertures 114 in the upper document feeder cartridge section 62a. The lower ends of the actuators 64 engage the upper ends of the leaf springs 108. This forces the upper part of the document feeder cartridge 62 downwardly slightly, bringing the friction pad 106 into contact with the ADF pick roller 22. This also brings the pinch rollers 26 into contact with the pinch rollers 24. Furthermore, the flat, non-tapered underside 82b (FIG. 5) of the white background element 82 is brought flat against the upper side of the scanner window 28. The closing of the pen door 56 thus clamps the document feeder cartridge 62 into the final position illustrated in FIG. 7 at which a predetermined desired tension or loading is placed on the pinch rollers 26.

During the operation of the combined printer and scanner 10, if a user desires to clear a paper jam, he or she need merely lift up the pen door 56, manually lift out the document feeder cartridge 62, and pull the jammed paper clear of the various pinch rollers inside the media chassis 14 and printer chassis 12. The user may also clean the scanner window 28 or remove any other debris by removing the document feeder cartridge 62. The single act of lifting the pen door 56 to its open position unclamps the document feeder cartridge 62, and its pinch rollers 26 from the pinch rollers 24. The simple act of removing the document feeder cartridge 62 allows access to jammed paper, and to the scanner window 28 for cleaning of the same. Once the jammed paper has been removed the scanner window 28 has been cleaned, or debris removed the user merely replaces the document feeder cartridge 62 into its initially loaded position illustrated in FIG. 6, and then swings the pen door 56 to its closed position illustrated in FIG. 7. This pivots the document feeder cartridge 62 slightly counter clockwise between FIG. 6 and FIG. 7, thus registering the document feeder cartridge against the datum surfaces represented by the underside of the shoulder projections 116. The clamping achieved through the interaction of the actuators 64 with the resilient leaf springs 108 places the proper amount of load or tension on the pinch rollers 26 and also ensures proper registration of the hemispherical projections 114 against the datum surfaces on the undersides of the shoulder projections 116.

Having described a preferred embodiment of the document feeder cartridge of the present invention, and an improved combination printer and scanner including the same, it should be apparent to those skilled in the art that my invention may be modified in both arrangement and detail. Therefore, the protection afforded my invention should only be limited in accordance with the scope of the following claims.

I claim:

1. A combination printer and scanner, comprising:
   a frame;
   roller means mounted in the frame for defining a single paper path therethrough;
   automatic sheet feeder means mounted to the frame for selectively providing to the single paper path clean paper print sheets;
   automatic document feeder means mounted to the frame for selectively providing to the single paper path documents having text and/or graphics printed thereon to be scanned;
   a scanner station adjacent the single paper path having a scanner window mounted in the frame for scanning documents conveyed through the single paper path;
   a printer station mounted in the frame for printing text and/or graphics on print sheets conveyed through the single paper path; and
   a document feeder cartridge manually removable from the frame, the cartridge normally being positioned adjacent the scanner window to partially define a segment of the single paper path adjacent the scanner station.

2. A combination printer and scanner according to claim 1 wherein the document feeder cartridge includes a plurality of pinch rollers that partially define the segment of the single paper path adjacent the scanner station.

3. A combination printer and scanner according to claim 2 and further comprising clamping means for releasing and applying tension on the pinch rollers to permit a print sheet or document jammed therebetween to be removed.

4. A combination printer and scanner according to claim 3 and further comprising pen door means hingedly connected to the frame for allowing access to the scanner station to permit the cleaning of a scanner window thereof.

5. A combination printer and scanner according to claim 4 wherein the clamping means is actuated by the opening and closing of the pen door means for releasing and applying tension on the pinch rollers to permit a print sheet or document jammed therebetween to be removed.

6. A combination printer and scanner according to claim 1 wherein the document feeder cartridge has a curved underside that partially defines the segment of the single paper path adjacent the scanner station.

7. A combination printer and scanner according to claim 1 wherein the document feeder cartridge includes a document stripper assembly mounted on an underside thereof.

8. A combination printer and scanner according to claim 5 wherein the clamping means includes at least one leaf spring mounted in the document feeder cartridge having a first end engageable by the pen door means on closing thereof.

9. A combination printer and scanner according to claim 2 wherein the document feeder cartridge further includes spring means for biasing the pinch rollers toward the single paper path when the cartridge is normally positioned in the frame.

10. A combination printer and scanner according to claim 1 wherein the document feeder cartridge has an underside including a white background element that aligns with, and substantially covers, the scanner window when the cartridge is normally positioned in the frame.

11. A combination printer and scanner according to claim 10 wherein the cartridge includes means for resiliently mounting the white background element relative to a main body of the cartridge.

12. A combination printer and scanner according to claim 5 wherein the clamping means includes at least one projection that extends from the pen door means and engages the cartridge upon closing of the pen door means.

13. A combination printer and scanner according to claim 2 wherein the document feeder cartridge includes a main hollow body inside which the pinch rollers are mounted.

14. A combination printer and scanner, comprising:
    a frame;
    roller means mounted in the frame for defining a single paper path therethrough;
    sheet feeder means mounted to the frame for selectively providing clean paper print sheets to the single paper path;
    document feeder means mounted to the frame for selectively providing documents having text and/or graphics printed thereon to be scanned to the single paper path;
    a scanner station mounted in the frame adjacent the single paper path for scanning documents conveyed along the single paper path;
    a printer station mounted in the frame including an ink jet cartridge for printing text and/or graphics on print sheets conveyed through the single paper path; and
    a manually removable document feeder cartridge positioned adjacent the scanner window to partially define a segment of the single paper path adjacent the scanner station.

15. A combination printer and scanner according to claim 14 wherein the document feeder cartridge includes a plurality of pinch rollers that partially define the segment of the single paper path adjacent the scanner station.

16. A combination printer and scanner according to claim 15 and further comprising clamping means for releasing and applying tension on the pinch rollers.

17. A combination printer and scanner according to claim 14 and further comprising pen door means hingedly connected to the frame for allowing access to the scanner station to permit the cleaning of a scanner window thereof.

18. A combination printer and scanner according to claim 14 wherein the frame has a plurality of datum surfaces and the document feeder cartridge has a plurality of registration projections that engage the datum surfaces.

19. A combination printer and scanner according to claim 14 wherein the document feeder cartridge includes a document stripper assembly mounted on an underside thereof.

20. A manually removable document feeder cartridge for a printer comprising:

a body having an underside configured to partially define a segment of a paper path through the printer, the body having a plurality of apertures formed therein;

a plurality of pinch rollers;

means for mounting the pinch rollers inside the body so that they protrude through corresponding ones of the apertures to engage and roll against a print sheet conveyed along the paper path past the underside of the body; and a document stripper assembly mounted on the underside of the body.

21. A manually removable document feeder cartridge according to claim 20 wherein the underside of the body has a reverse curvature.

22. A manually removable document feeder cartridge according to claim 20 and further comprising a shaft mounted inside the body, the pinch rollers being journaled on the shaft, and spring means for biasing the shaft away from the underside of the body.

23. A manually removable document feeder cartridge according to claim 20 and further comprising a white background element positioned on the underside of the body for alignment with a scanner window of the printer.

24. A manually removable document feeder cartridge according to claim 23 and further comprising a manually gripable projection formed on an upper side of the body.

25. A manually removable document feeder cartridge for a printer comprising:

a body having an underside configured to partially define a segment of a paper path through the printer, the body having a plurality of apertures formed therein;

a plurality of pinch rollers;

means for mounting the pinch rollers inside the body so that they protrude through corresponding ones of the apertures to roll against a print sheet conveyed along the paper path past the underside of the body; and a white background element on the underside of the body positioned for alignment with the scanner window of the printer.

* * * * *

UNITED STATES PATENT AND TRADEMARK OFFICE
CERTIFICATE OF CORRECTION

PATENT NO    : 5,833,381

DATED        : November 10, 1998

INVENTOR(S)  : Kellogg et al.

It is certified that error appears in the above-identified patent and that said Letters Patent is hereby corrected as shown below:

On the face page of the patent at [75], please delete "Stoddar" and insert in lieu thereof --Stodder--.

Signed and Sealed this

Thirtieth Day of March, 1999

Attest:

Q. TODD DICKINSON

Attesting Officer

Acting Commissioner of Patents and Trademarks